United States Patent [19]

Adrian et al.

[11] 4,435,912
[45] Mar. 13, 1984

[54] CARD CARRYING MICROFILM AND ASSOCIATED READING LENS

[75] Inventors: David L. Adrian, Abilene; Sam H. Young, Fort Worth, both of Tex.

[73] Assignee: Frank J. King, Abilene, Tex.

[21] Appl. No.: 13,158

[22] Filed: Feb. 21, 1979

Related U.S. Application Data

[63] Continuation of Ser. No. 888,407, Mar. 20, 1978, abandoned.

[51] Int. Cl.³ .............................................. G02B 27/04
[52] U.S. Cl. .................................... 40/365; 40/158 B; 40/626; 350/140
[58] Field of Search ....................... 40/365, 2.2, 158 R, 40/158 B; 350/140

[56] References Cited

U.S. PATENT DOCUMENTS

| | | | |
|---|---|---|---|
| 2,190,646 | 2/1940 | Branson | 350/140 |
| 3,117,608 | 1/1964 | Goss et al. | 40/2.2 X |
| 3,505,140 | 4/1970 | Dunn | 40/2.2 X |
| 3,755,935 | 9/1973 | Annenberg | 40/2.2 |
| 3,792,542 | 2/1974 | Cohan | 40/2.2 X |

FOREIGN PATENT DOCUMENTS 1216605  11/1959  France ..................................... 40/365

*Primary Examiner*—Gene Mancene
*Assistant Examiner*—James Hakomaki
*Attorney, Agent, or Firm*—Wofford, Fails & Zobal

[57] ABSTRACT

A card of size suitable for convenient carrying by a person, for example, in a billfold or wallet, the card having an information portion upon which information appears that can be read in the normal manner, a portion carrying microfilm upon which information is recorded, and a portion carrying a lens suitable for reading the microfilmed portion.

1 Claim, 10 Drawing Figures

CARD CARRYING MICROFILM AND ASSOCIATED READING LENS

This is a continuation application under 37 CFR 1.60 of prior application Ser. No. 888,407, filed on Mar. 20, 1978 now abandoned.

FIELD OF THE INVENTION

The present invention relates to microfilmed information and means for reading same, and more particularly to microfilm incorporated in a card of generally billfold size and means for reading same.

BACKGROUND OF THE INVENTION

Microfilmed information is commonly incorporated in a plastic card of billfold size so that it can be conveniently carried by a person. The most usual application for this is an emergency card wherein the microfilm carries pertinent medical information. In the event of emergency, the medical information is immediately available to the treating physician. It is essential, of course, that the treating physician have some means for reading the microfilmed information. In the past it has been necessary for such means to be separately available; which is to say that the person carrying the emergency card does not carry any means for reading same. Unfortunately, in many cases the treating physician does not have any readily available means for reading the microfilmed information.

It is an object of this invention to insure that a means for reading the microfilmed information is in every case immediately available.

Another object of this invention is to provide a microfilm reading means which is carried by the same card which carries the microfilmed information.

Another object of the invention is to provide a microfilm reading means which is incorporated in the card which carries the microfilmed information.

These and other objects are effected by the invention as will be apparent from the following description taken in accordance with the accompanying drawings, forming a part of this application.

DESCRIPTION OF PREFERRED EMBODIMENTS

Figure 1:
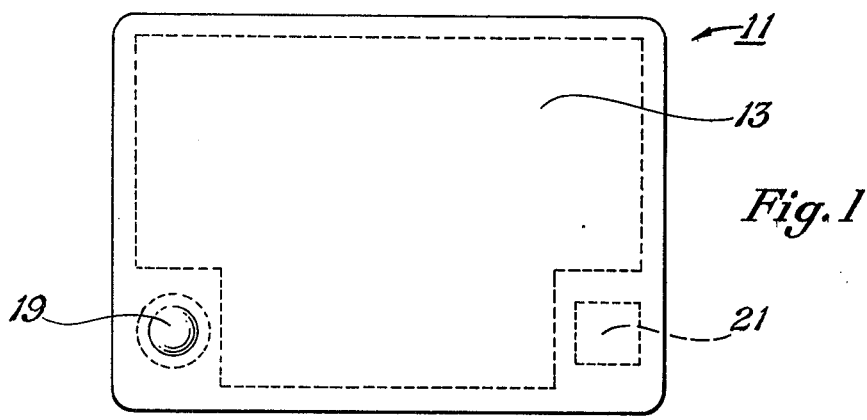
FIG. 1 is a schematic plan view showing a card which incorporates both microfilmed information and reading means for same, in accordance with one embodiment of the invention.
Figure 2:
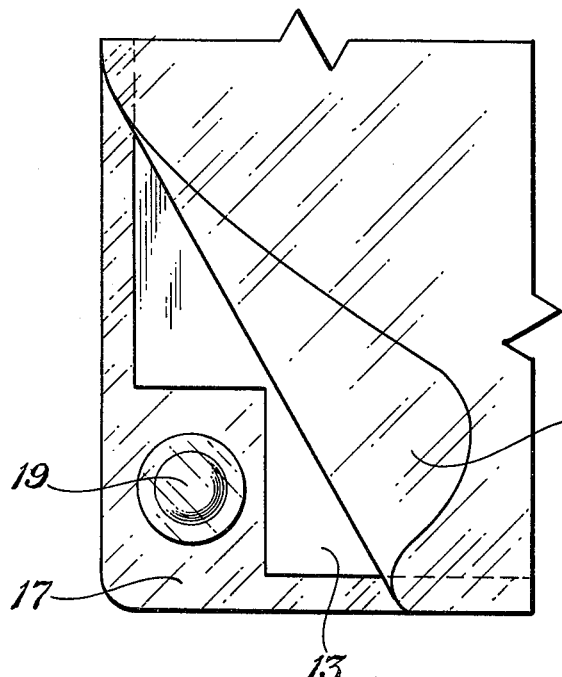
FIG. 2 is an enlarged fragmentary view showing the lower left corner portion of the card of FIG. 1.
Figure 3:
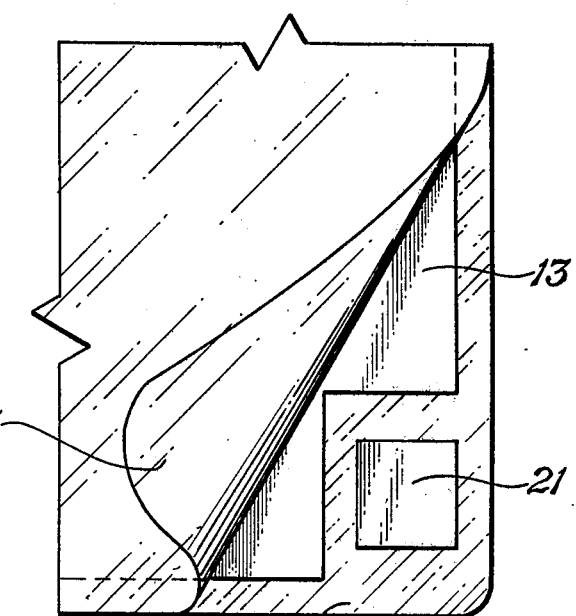
FIG. 3 is an enlarged fragmentary view showing the lower right corner portion of the card of FIG. 1.

Referring now to the drawings, particularly FIGS. 1-3, there is shown a typical card 11 embodying the present invention. The card 11 comprises a conventional information portion 13 on which pertinent information appears which can be read in the normal manner. The information portion 13 is sandwiched between front and rear plastic sheets 15, 17 which are sealed along their peripheral edge portions in a conventional manner. The information portion 13 is notched at its lower left and right corner regions so as to provide space for a lens 19 disposed at one corner region and microfilm 21 disposed at the other corner region.

In this embodiment, the lens 19 and microfilm 21 are sandwiched along with information portion 13 between the plastic sheets 15, 17. The microfilm 21 may carry any pertinent information according to the purpose of the card 11. Typically, the card 11 may contain emergency information and is carried by the person to whom it pertains, and the microfilm 21 carries pertinent medical information.

To read the microfilm 21 it is only necessary for the reader to bend the card 11 so as to align the lens 19 with the microfilm 21 at the requisite focal distance, using a light source as a background. No special light source is needed. Ordinary room lighting illumination is satisfactory, or even normal daylight is adequate.

The lens 19 is preferably plastic and typically is a double convex type having a power of about 10 with a focal length of about 1 inch. The lens 19 can be quite small, having a diameter of about ½ inch and a thickness of about 1/16 inch.

Figure 4:
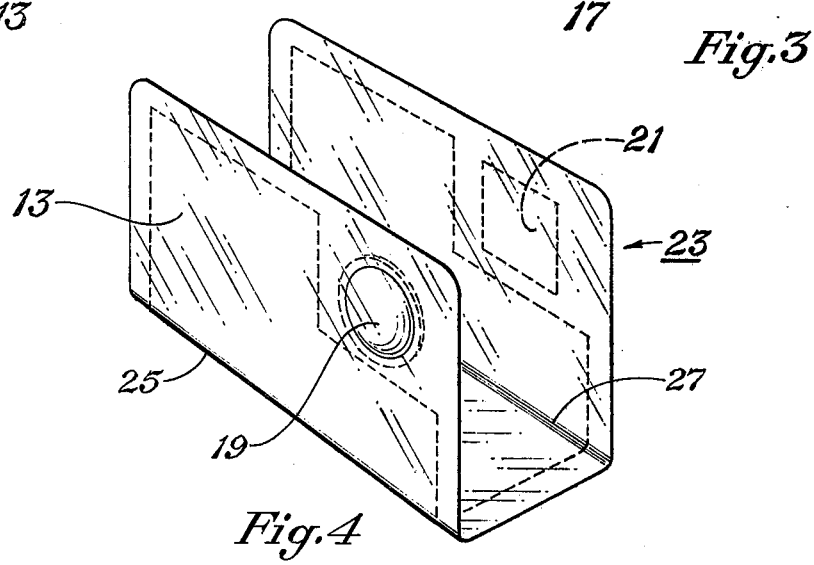
FIG. 4 is a schematic perspective view showing a card which incorporates both microfilmed information and reading means for same, in accordance with another embodiment of the invention.

The embodiment of the invention as shown by FIG. 4 is like that of FIGS. 1-3 above-described with the exception that the card 23 has been modified to provide a hinge effect along the lines 25, 27, which are parallel and are spaced apart a distance substantially equal to the lens focal length, thus making it more convenient for the reader to hold the lens 19 at a proper distance from the microfilm 21.

Figure 8:
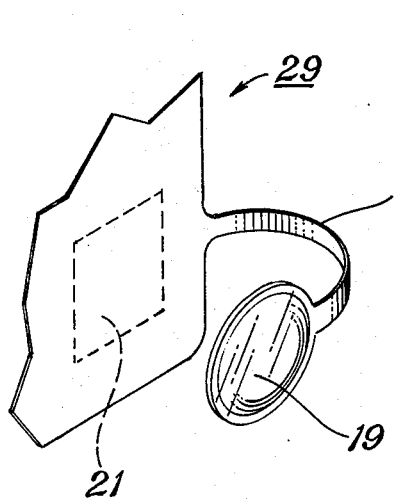
FIGS. 8, 9 and 10 are enlarged fragmentary views showing further embodiments of the invention.

In the embodiment shown by FIG. 8, the lens 19 is attached to a card 29 by means of a pig tail 31. In this case, of course, the notched portion in one of the corners of the card information portion 13 may be eliminated.

Figure 9:
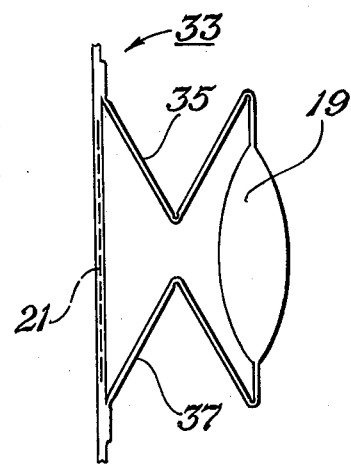

In the embodiment shown by FIG. 9, the lens 19 is attached to a card 33 by means of foldable strips 35, 37, which preferably have a length, when extended, that is substantially equal to the focal length of lens 19, so as to make it convenient for the reader to hold the lens 19 a proper distance from the microfilm 21.

Figure 10:
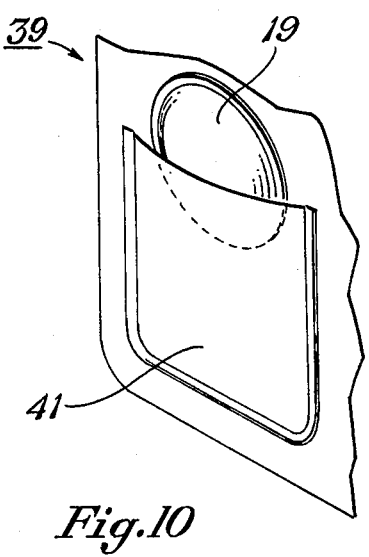

In the embodiment shown by FIG. 10, the lens 19 is not physically attached to or incorporated in the card 39, but is carried in a pocket 41 which is incorporated in the card 39.

Figure 5:
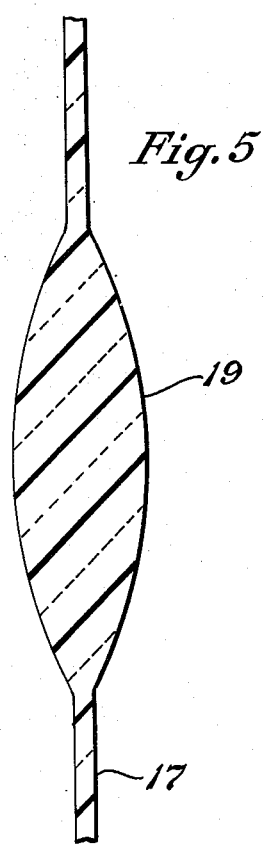
FIGS. 5, 6 and 7 are enlarged transverse section views showing different lens arrangements that may be utilized with the invention.
Figure 6:
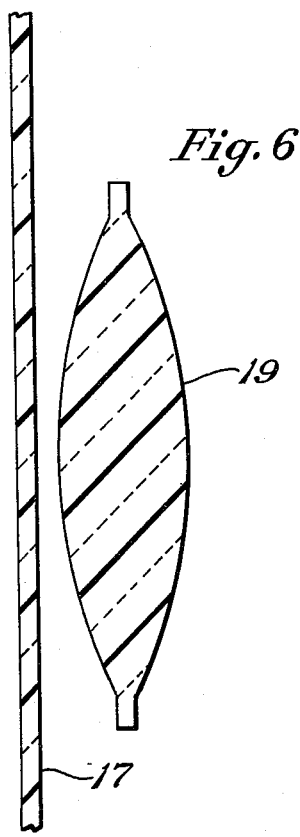

In the embodiments of FIGS. 1-3 and FIG. 4, the lens 19 may be a separate piece, as shown by FIG. 6 and may be sandwiched between plastic sheets as hereinabove described. It is possible, however, that the lens 19 may be actually molded into one of the plastic sheets, as shown by FIG. 5. Also, in the FIG. 8 embodiment the lens 19 may be an integral molded extension of the pig tail 31, and in the FIG. 9 embodiment the lens 19 may be an integral molded extension of the foldable strips 35, 37.

Figure 7:
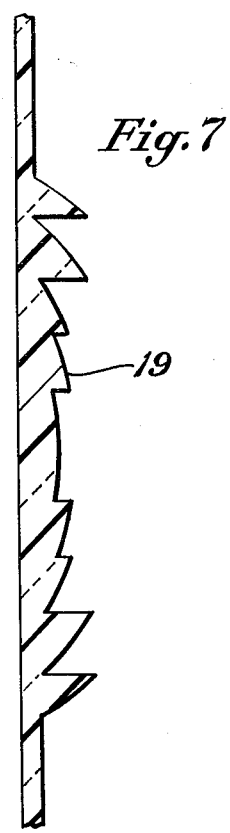

In all cases, the lens 19, instead of being a double convex tape, may be a Fresnel type as shown by FIG. 7. The Fresnel type lens has the advantage of being thinner for a given power than the double convex type.

Having described the invention in connection with certain embodiments thereof, it is understood that further modifications may suggest themselves to those skilled in the art and it is intended to cover such modifications as fall within the scope of the appended claims.

What is claimed is:

1. An emergency medical data card comprising:
   (a) an information portion upon which information appears that can be read in the normal manner with the naked eye, said information portion consisting of a thickness of flexible paper stock having a generally rectangular shape and billfold size, with portions removed at opposite end regions;
   (b) a plastic lens disposed at one of said end regions;
   (c) a microfilm portion upon which information is recorded and which is disposed at the other of said end regions opposite said one end region;
   (d) a pair of juxtaposed flexible clear plastic sheets laminating at least said information portion and said microfilm portion to provide a one-piece, unitary, generally planar card structure;
   (e) said lens being a molded integral part of a clear plastic sheet portion of said card;
   whereby a reader may bend the card to align and focus the lens on the microfilm for the reading of same without the need for any special auxiliary apparatus.

* * * * *